(12) United States Patent
Shoji et al.

(10) Patent No.: US 11,163,366 B2
(45) Date of Patent: Nov. 2, 2021

(54) TACTILE DEVICE

(71) Applicant: Nippon Telegraph and Telephone Corporation, Tokyo (JP)

(72) Inventors: Tetsufumi Shoji, Tokyo (JP); Toshiki Wada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/040,641

(22) PCT Filed: Feb. 26, 2019

(86) PCT No.: PCT/JP2019/007223
§ 371 (c)(1),
(2) Date: Sep. 23, 2020

(87) PCT Pub. No.: WO2018/187892
PCT Pub. Date: Oct. 3, 2018

(65) Prior Publication Data
US 2021/0018984 A1    Jan. 21, 2021

(30) Foreign Application Priority Data
Mar. 26, 2018    (JP) .............................. JP2018-057759

(51) Int. Cl.
*G06F 3/044* (2006.01)
*G06F 3/01* (2006.01)
*G08B 6/00* (2006.01)

(52) U.S. Cl.
CPC .............. *G06F 3/016* (2013.01); *G06F 3/044* (2013.01); *G08B 6/00* (2013.01)

(58) Field of Classification Search
CPC ...... G06F 3/016; G06F 3/044; G06F 3/03547; G08B 6/00
See application file for complete search history.

(56) References Cited

U.S. PATENT DOCUMENTS

| | | | |
|---|---|---|---|
| 2003/0174121 A1* | 9/2003 | Poupyrev | G06F 3/04886 345/156 |
| 2014/0078117 A1* | 3/2014 | Asano | G06F 3/038 345/179 |

(Continued)

FOREIGN PATENT DOCUMENTS

| | | |
|---|---|---|
| JP | 201462962 | 4/2014 |
| JP | 201733335 | 2/2017 |

(Continued)

*Primary Examiner* — Robert J Michaud
(74) *Attorney, Agent, or Firm* — Slater Matsil, LLP

(57) ABSTRACT

A sensor detects contact of a finger of a user who grips a casing. A determination unit determines whether sensor information on a contact position of the finger detected by the sensor matches preset reference position information. A notification unit notifies the user of at least one of an indication indicating that the contact position of the finger is shifted from a reference position and an indication indicating that the contact position of the finger matches the reference position when the sensor information matches the reference position information. A tactile stimulus generation unit 105 provides a tactile stimulus for the user gripping the casing.

16 Claims, 14 Drawing Sheets

(56) References Cited

U.S. PATENT DOCUMENTS

2017/0136354 A1\* 5/2017 Yamano .................. A63F 13/92
2018/0369865 A1   12/2018 Shoji et al.

FOREIGN PATENT DOCUMENTS

| JP | 201737583 | 2/2017 |
| JP | 1571053 | 3/2017 |
| WO | 2017115729 | 6/2017 |

\* cited by examiner

TACTILE DEVICE

CROSS-REFERENCE TO RELATED APPLICATIONS

This application is a national phase entry of PCT Application No. PCT/JP2019/007223, filed on Feb. 26, 2019, which claims priority to Japanese Application No. 2018-057759, filed on Mar. 26, 2018, which applications are hereby incorporated herein by reference.

TECHNICAL FIELD

The present invention relates to a haptic apparatus that provides a tactile stimulus for users.

BACKGROUND

Terminal apparatuses using haptic devices using vibration, an electric stimulus, mechanistic deformation, a piezoelectric element, and the like, and services using the haptic devices are being developed. The haptic devices are designed assuming, as a base, a specific gripping shape in consideration of a positional relationship of an actuator, an electrode, and the like, mechanistic efficiency, and the like for an effective exertion of performance. For example, there is proposed an apparatus that is provided with vibrators at one end and the other end of a casing, lets a user place a thumb of a left hand on the one end side and a thumb of a right hand on the other end side to grip the casing, and provides the user with a rotational tactile force sensation (see Patent Literature 1).

The above-described technique has a configuration in which the tactile force sensation is most effectively generated by lightly gripping vicinities of left and right ends of the casing with fingertips. However, in the above-described technique, since the degree of freedom of grip is high, the casing is often not gripped as intended by a designer. If a different place is gripped, the tactile force sensation of the user will be reduced. Therefore, measures have been taken such as guiding how to grip by the external shape and the like of the casing (see FIG. 15 and Patent Literature 2).

CITATION LIST

Patent Literature

Patent Literature 1: International Publication No. WO 2017/115729
Patent Literature 2: Design Registration No. 1571053.

SUMMARY

Technical Problem

However, a human hand can grip an object by adapting to various shapes, and often grips at a place not intended by the designer even if the object has the external shape for guiding like the above-described technique. Since the state of a grip portion tends to be hidden in a palm, it is not easy to check an actual practice or a recorded video of another operator in order for the operator to grasp a correct grip method. When an instructor or the like gives guidance, it is not easy to check the gripping state of the operator. For this reason, for example, it has been necessary in the past for an instructor familiar with characteristics of a haptic apparatus to give guidance by touching fingers of each operator, and there was a problem that it was not easy to guide how to grip the casing of the haptic apparatus.

Embodiments of the present invention have been made to solve problems as described above, and an object is to make it possible to more easily guide how to grip a casing.

Means for Solving the Problem

A haptic apparatus according to embodiments of the present invention includes a casing that can be gripped, at least one sensor that detects contact of a finger of a user who grips the casing, a determination unit that determines whether sensor information on a contact position of the finger detected by the sensor matches preset reference position information, a notification unit that notifies at least one of an indication indicating that the contact position of the finger is shifted from a reference position when the sensor information does not match the reference position information and an indication indicating that the contact position of the finger matches the reference position when the sensor information matches the reference position information, and a tactile stimulus generation unit that provides a tactile stimulus for the user gripping the casing.

In the haptic apparatus, the plurality of sensors are provided in the casing, and the determination unit uses, as the sensor information, combination of detection results of contact of the finger by the plurality of sensors or a value derived by a specific relational formula from the detection results of contact of the finger by the plurality of sensors.

In the haptic apparatus, the sensor may be of a capacitance type.

In the haptic apparatus, the tactile stimulus generation unit may be composed of an actuator that generates mechanical vibration. The actuator provides a tactile stimulus, for example, by asymmetrical vibration. In this case, at least one of electrodes constituting the sensor is preferably connected to an extrapolation unit of the actuator so as to be common or electrically equipotential.

In the haptic apparatus, the tactile stimulus generation unit may be composed of electrodes that provide an electric stimulus to a finger. In this case, at least one of the electrodes constituting the sensor is preferably connected to the electrodes constituting the tactile stimulus generation unit so as to be common or electrically equipotential.

Effects of Embodiments of the Invention

As described above, according to embodiments of the present invention, it is possible to obtain an excellent effect in which how to grip the casing can be more easily guided.

DETAILED DESCRIPTION OF ILLUSTRATIVE EMBODIMENTS

Figure 1:
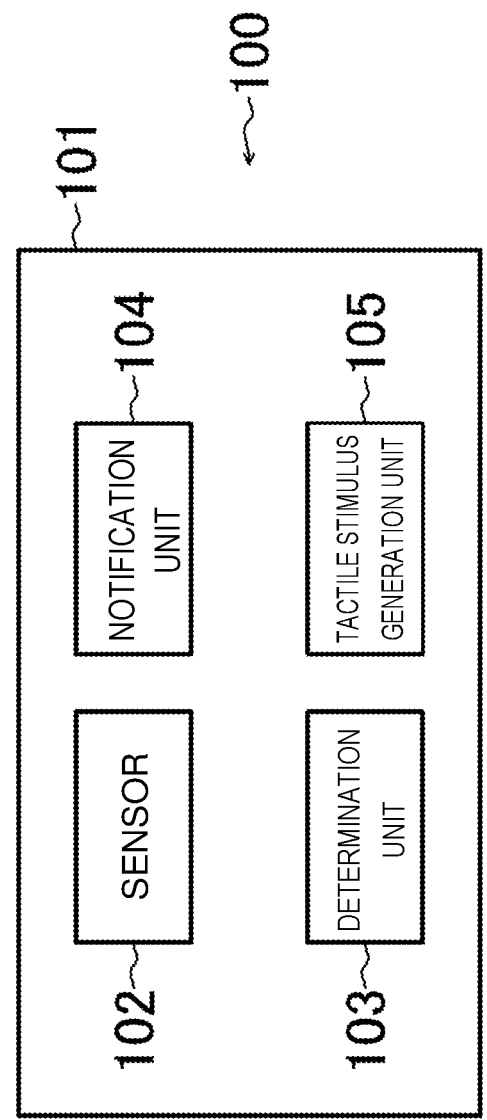
FIG. 1 is a configuration diagram showing a configuration of a haptic apparatus according to an embodiment of the present invention.

Hereinafter, a haptic apparatus 100 according to an embodiment of the present invention will be described with reference to FIG. 1. The haptic apparatus 100 includes a casing 101, a sensor 102, a determination unit 103, a notification unit 104, and a tactile stimulus generation unit 105.

Figure 2:
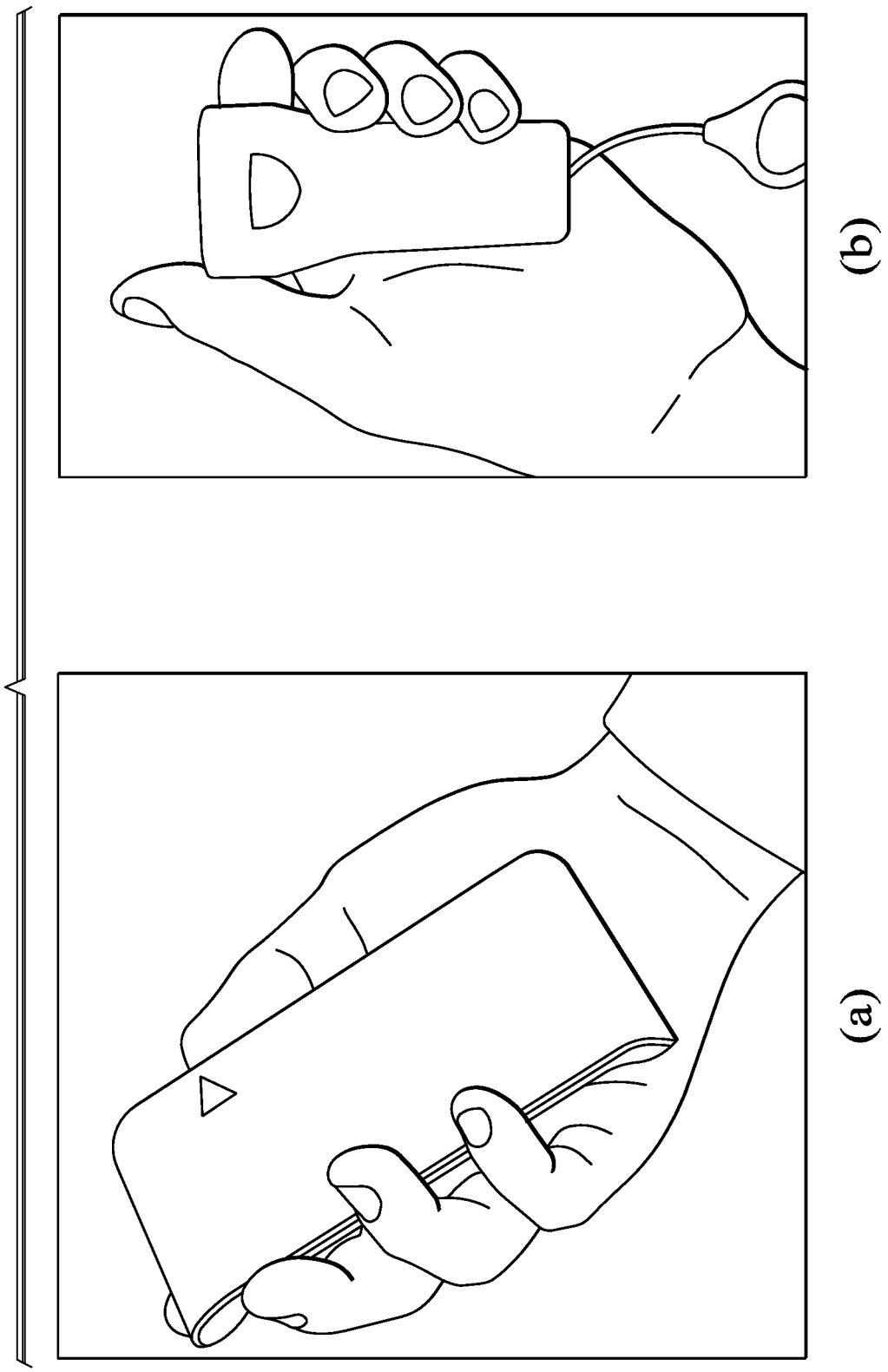
FIG. 2 is a photo showing an example of the haptic apparatus.

The casing 101 has an external shape that can be gripped by a hand of a user, for example, as exemplified in a photo in FIG. 2. The sensor 102 detects contact of a finger of the user who grips the casing 101. The sensor 102 is, for example, of a capacitance type. The determination unit 103 determines whether sensor information on a contact position of the finger detected by the sensor 102 matches preset reference position information. The sensor 102 is, for example, housed in the casing 101.

For example, a plurality of sensors 102 are provided in the casing 101, and the determination unit 103 uses, as the sensor information, combination of detection results of contact of a finger by the plurality of sensors 102. In addition, the determination unit 103 uses, as the sensor information, a value derived by a specific relational formula from the detection results of contact of the finger by the plurality of sensors 102. The determination unit 103 is a small computer apparatus including, for example, a CPU (Central Processing Unit), a main storage device, and an external storage device, and the CPU is operated by a program deployed in the main storage device, thereby implementing each function described above. The determination unit 103 is, for example, housed in the casing 101.

The notification unit 104 notifies the user at least one of an indication indicating that the contact position of the finger is shifted from a reference position when the sensor information does not match the reference position information and an indication indicating that the contact position of the finger matches the reference position when the sensor information matches the reference position information. The tactile stimulus generation unit 105 provides a tactile stimulus for the user gripping the casing 101. The tactile stimulus generation unit 105 is composed of, for example, an actuator that generates mechanical vibration. The actuator provides a tactile stimulus, for example, by asymmetrical vibration. The tactile stimulus generation unit 105 is composed of, for example, electrodes that provide an electric stimulus to a finger. The notification unit 104 and tactile stimulus generation unit 105 are, for example, housed in the casing 101.

Figure 3:
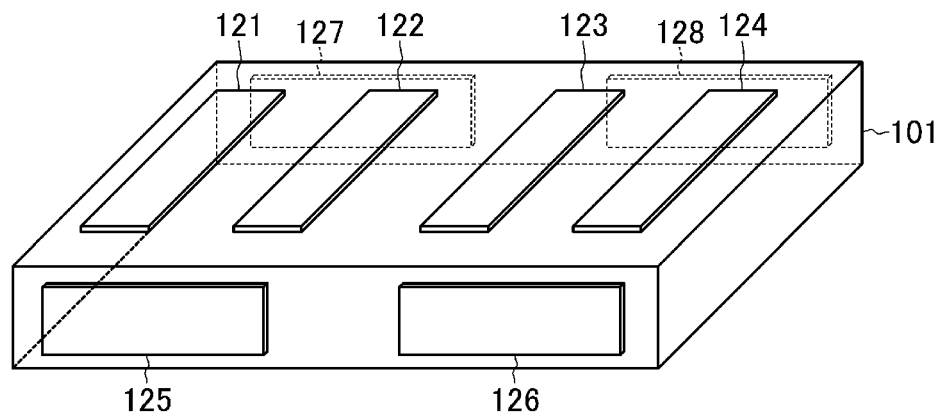
FIG. 3 is a perspective view showing a partial configuration of the haptic apparatus according to the embodiment of the present invention.

The sensor 102 includes, for example, a plurality of electrodes (detection electrodes) 121, 122, 123, 124, 125, 126, and 127, as shown in FIG. 3. The electrodes 121, 122, 123, and 124 are disposed on a main surface of the casing 101. In addition, the electrodes 125 and 126 are disposed on one side surface adjacent to a circumferential surface of the casing 101. The electrodes 127 and 128 are disposed on a side surface facing the side surface where the electrodes 125 and 126 are disposed. Material of the casing 101 at portions where the electrodes 121, 122, 123, 124, 125, 126, and 127 are in contact is made of an insulating material such as plastic or hard vinyl.

Figure 4:
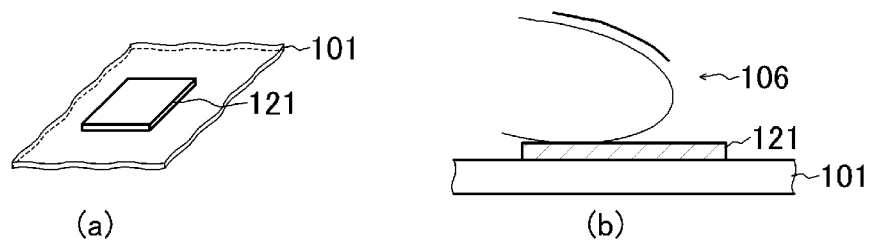
FIG. 4 is a perspective view (a) and a sectional view (b) showing a partial configuration of the haptic apparatus according to the embodiment of the present invention.
Figure 5:
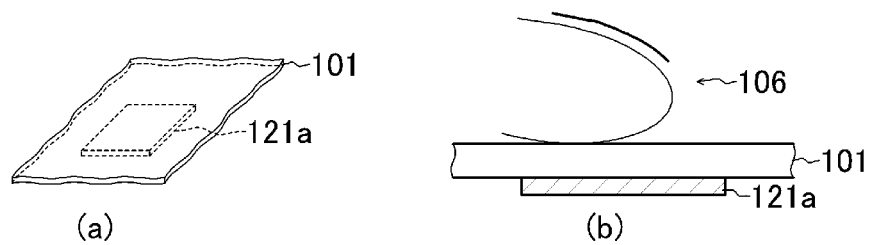
FIG. 5 is a perspective view (a) and a sectional view (b) showing a partial configuration of the haptic apparatus according to the embodiment of the present invention.

The electrodes 121, 122, 123, 124, 125, 126, and 127 detect, for example, capacitance caused by the contact of the finger of the user gripping the casing 101. For example, as shown in FIG. 4, the electrode 121 is formed on a surface side of the casing 101 and can be contacted by a finger 106. As shown in FIG. 5, an electrode 121a is formed on a backside of the casing 101, and the finger 106 may not contact the electrode 121a.

Figure 6:
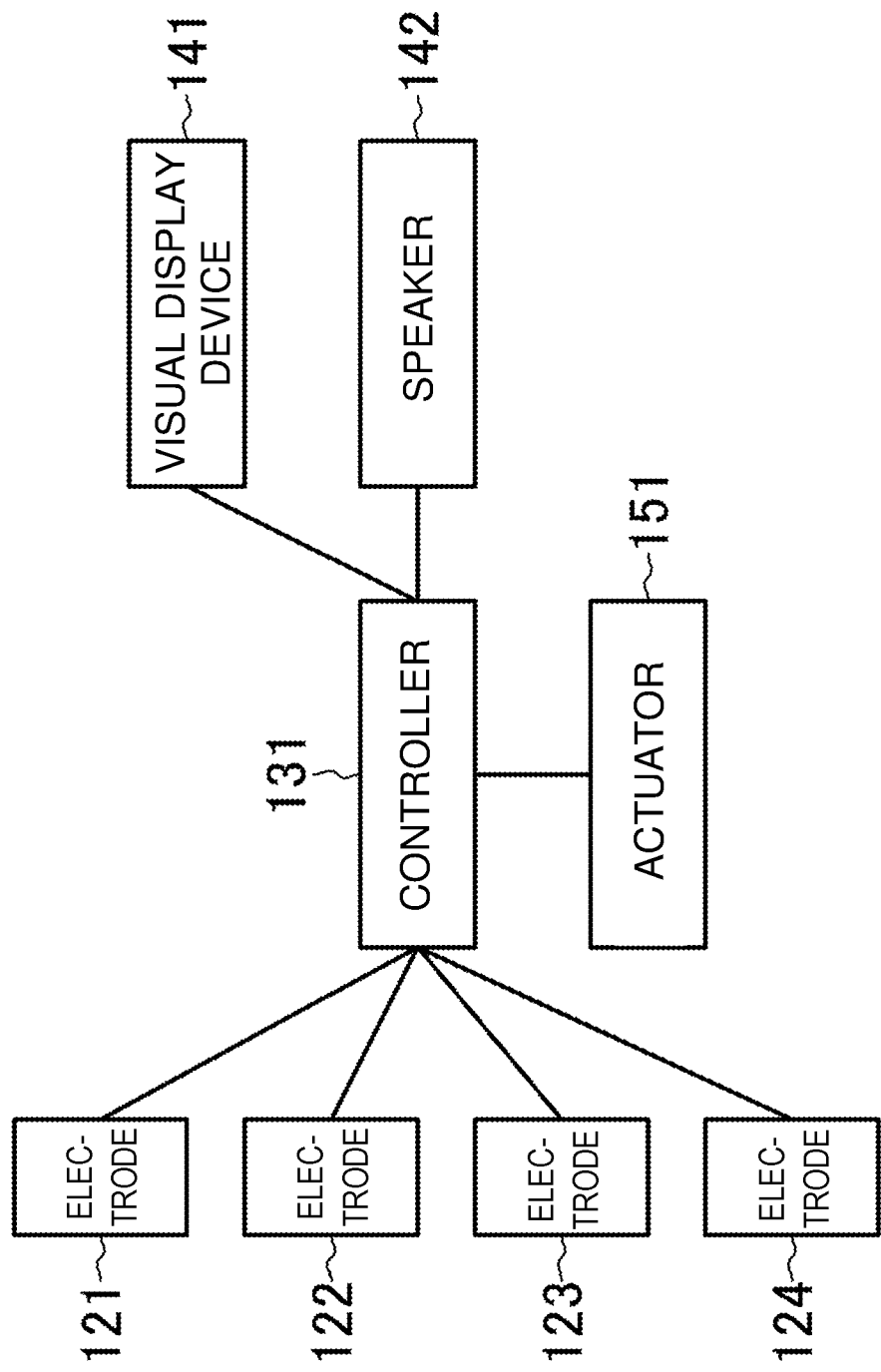
FIG. 6 is a configuration diagram showing a configuration of the haptic apparatus according to the embodiment of the present invention.

In the haptic apparatus 100, for example, the electrodes 121, 122, 123, and 124 are connected to a controller 131, as shown in FIG. 6. When the contact of the finger of the user is detected by the electrodes 121, 122, 123, and 124, this state is determined by a determination unit included in the controller 131. A determination result thereof is, for example, displayed on a visual display device 141 serving as a notification unit by control of the controller 131. In addition, the determination result is output as sound from a speaker 142 serving as a notification unit by control of the controller 131. In addition, the determination result may be notified by operating an actuator 151 which is a tactile stimulus generation unit.

Figure 7:
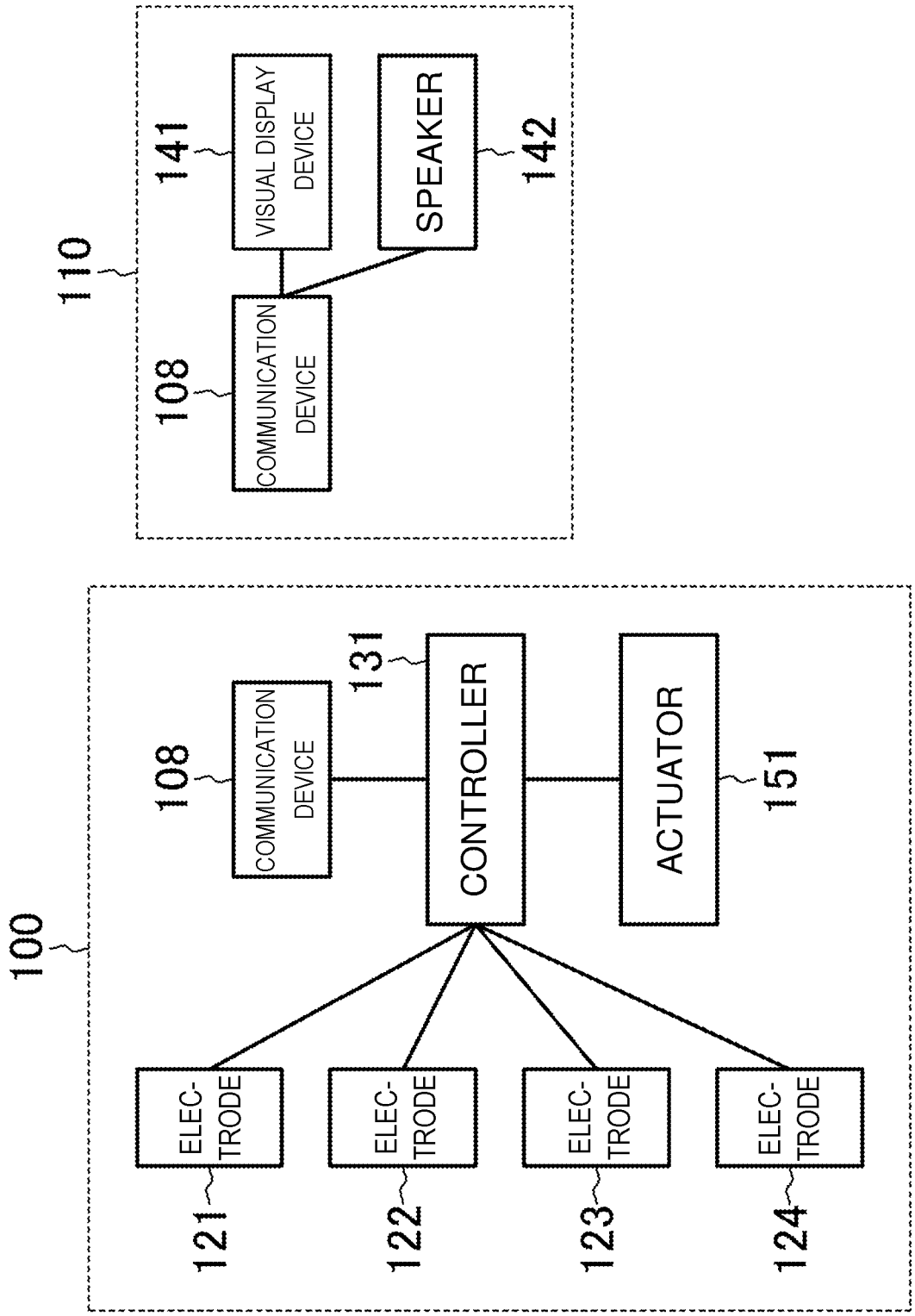
FIG. 7 is a configuration diagram showing a configuration of the haptic apparatus according to the embodiment of the present invention.

Regarding the notification of the determination result, as shown in FIG. 7, a communication device 107 of the haptic apparatus 100 may transmit it to a communication device 108 of a terminal apparatus 110 by wireless or wired communication, and in the haptic apparatus 100, the visual display device 141 and the speaker 142 may output it.

At least one of the electrodes constituting the sensor 102 may be connected to an extrapolation portion of the actuator so as to be common or electrically equipotential. When the extrapolation portion of the actuator is made of metal and electrically floating, if a finger is disposed on the casing 101 at this portion, electrostatic coupling occurs. In this case, it is a cause of a decrease in capacitance detection performance by the sensor 102. Here, if the extrapolation portion of the actuator is grounded, static electricity generated in the casing 101 is attenuated by the grounding, and therefore it cannot be grounded. On the other hand, the above-mentioned problem can be solved by connecting at least one of the electrodes constituting the sensor 102 to the extrapolation portion of the actuator so as to be common or electrically equipotential.

Figure 8:
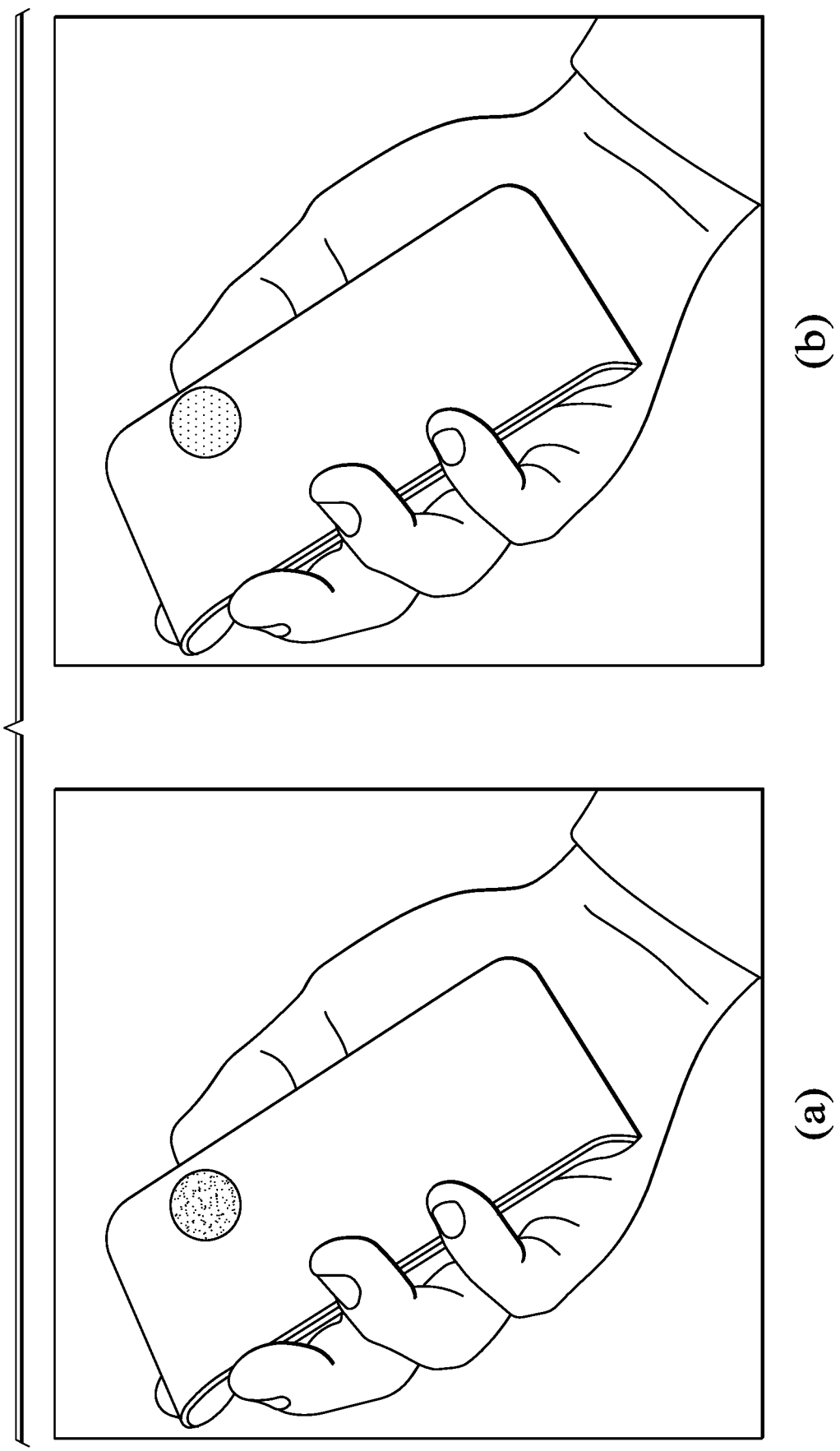
FIG. 8 is a photo showing an example of the haptic apparatus.

Next, a notification example of the determination result will be described. For example, if the sensor information does not match the reference position information and it is determined that a gripping position is shifted, a red lamp is turned on, notifying the user that the contact position (gripping position) of the finger is shifted, as shown in (a) of FIG. 8. On the other hand, if the sensor information matches the reference position information and it is determined that the gripping position is correct, a blue lamp is turned on, notifying the user that the gripping position is correct, as shown in (b) of FIG. 8. Note that by changing brightness, display of graphics or characters, display positions, and the like, the matching or not of the gripping position may be notified.

Figure 9:
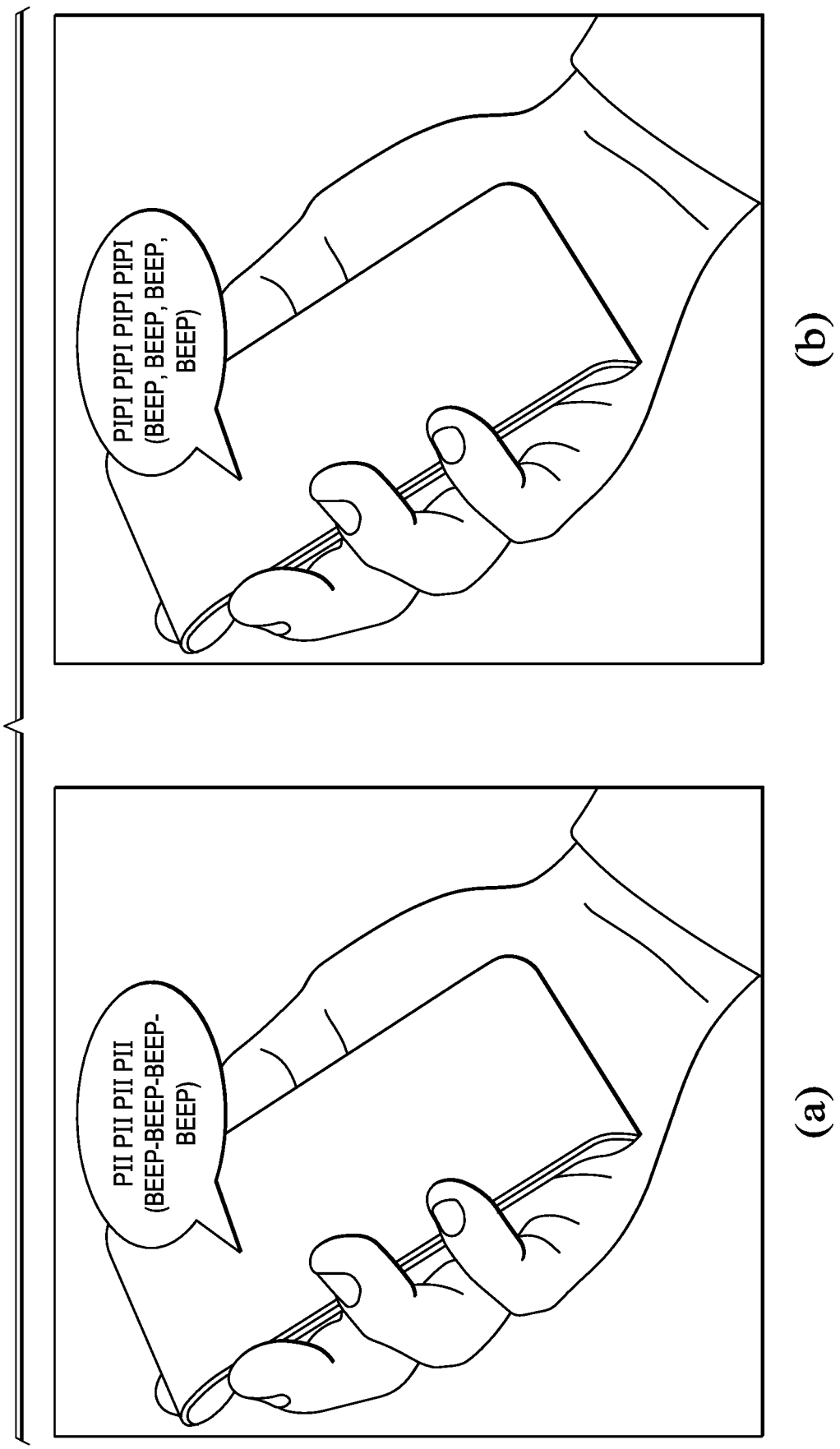
FIG. 9 is a photo showing an example of the haptic apparatus.

For example, if the sensor information does not match the reference position information and it is determined that the gripping position is shifted, the user is notified that the gripping position is shifted by continuous sound from a speaker, as shown in (a) of FIG. 9. On the other hand, if the sensor information matches the reference position information and it is determined that the gripping position is correct, the user is notified that the gripping position is correct by discontinuous sound from the speaker, as shown in (b) of FIG. 9. Note that by changing pitch, volume, melodies, or the like, matching or not of the gripping position may be notified.

Figure 10:
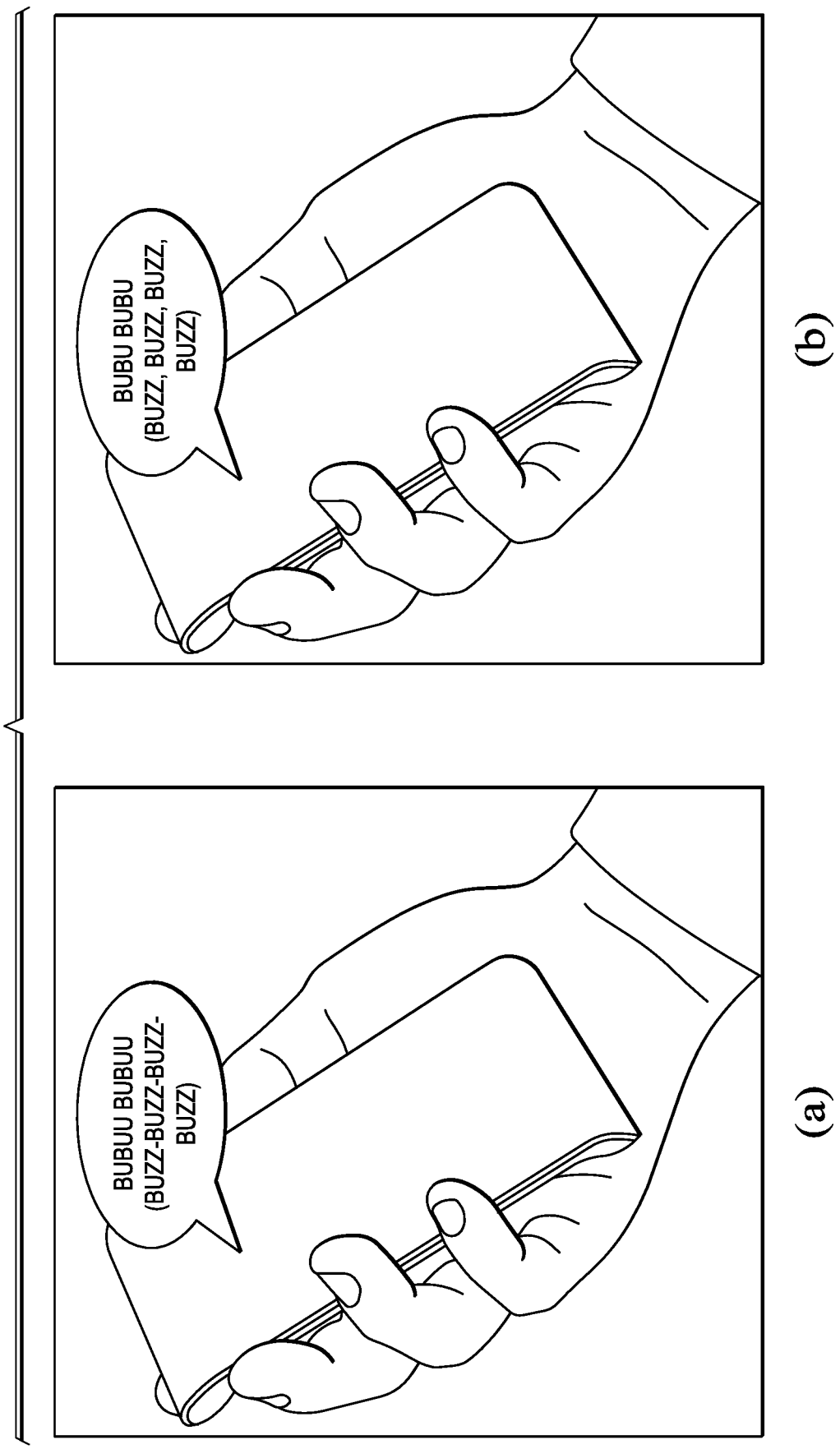
FIG. 10 is a photo showing an example of the haptic apparatus.

For example, if the sensor information does not match the reference position information and it is determined that the gripping position is shifted, the user is notified that the gripping position is shifted by continuous vibration by the actuator, as shown in (a) of FIG. 10. On the other hand, if the sensor information matches the reference position information, and it is determined that the gripping position is correct, the user is notified that the gripping position is correct by discontinuous vibration by the actuator, as shown in (b) of FIG. 10. Note that by changing vibration strength, vibration frequencies, vibration positions, or the like, matching or not of the gripping position may be notified.

Figure 11:
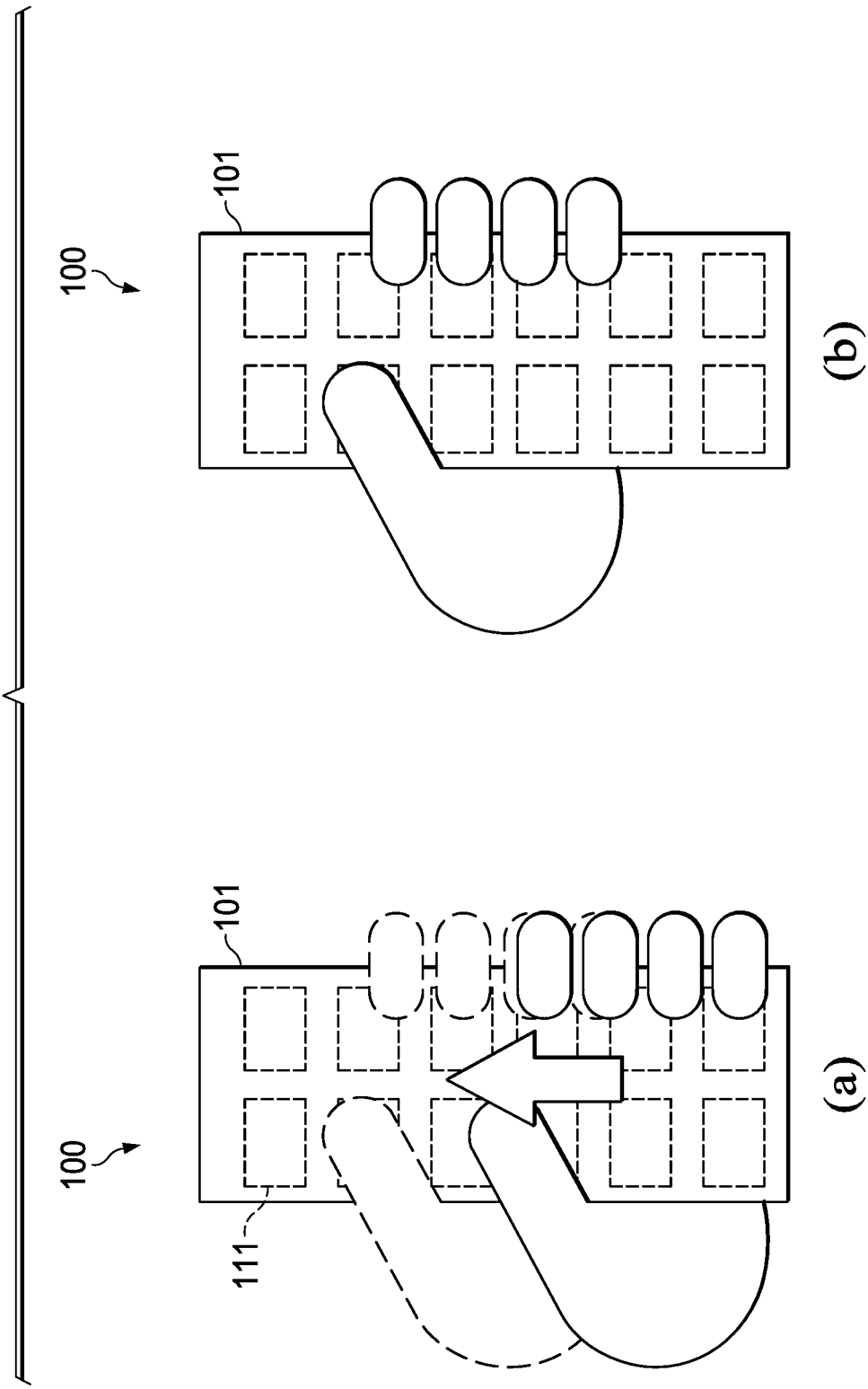
FIG. 11 is an explanatory diagram explaining a guidance example of how to grip using the haptic apparatus according to the embodiment of the present invention.

When the tactile stimulus generation unit 105 is composed of electrodes that provide an electric stimulus to a finger, a plurality of electrodes 111 are provided in the casing 101 of the haptic apparatus 100, as shown in FIG. 11. For example, if the sensor information does not match the reference position information and it is determined that the gripping position is shifted, the electric stimuli by the electrodes 111 are generated in order from a lower side electrode 111 to an upper side electrode 111 in the casing 101, as shown in (a) of FIG. 11. Thereby, the user is urged to move the hand gripping the casing 101 to the upper side thereof. As shown in (b) of FIG. 11, if the gripping position becomes a correct state, the sensor information matches the reference position information, and it is determined that the gripping position is correct, the electric stimuli by the electrodes 111 are stopped.

For example, a weak current is caused to flow between adjacent electrodes 111 by a stimulation circuit and the current between them is detected by a detection circuit. The above-described circuits are provided every adjacent electrodes 111. For example, when a thumb and an index finger contact the adjacent electrodes 111, current flows between the electrodes, and contact is detected. When they do not contact both of the adjacent electrodes 111, current does not flow and it can be determined they do not contact. In this configuration, at least one of the electrodes constituting the sensor 102 is preferably connected to the electrodes constituting the tactile stimulus generation unit 105 so as to be common or electrically equipotential. By doing like this, it becomes possible to prevent a decrease in capacitance detection performance by the sensor 102 in the same manner as described above.

Figure 12:
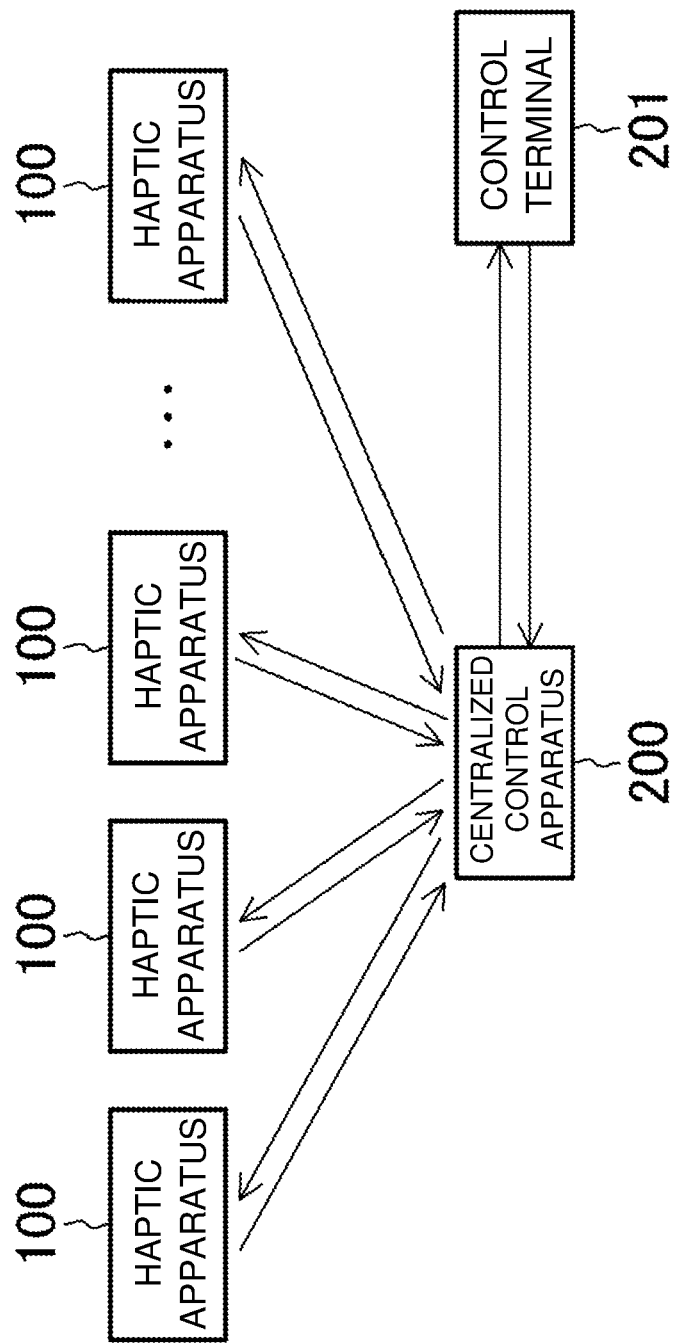
FIG. 12 is a configuration diagram showing a configuration of the haptic apparatus according to the embodiment of the present invention.

As shown in FIG. 12, the sensor information from the plurality of haptic apparatuses 100 may be relayed by a centralized control apparatus 200 and transmitted to a control terminal 201, and the control terminal 201 may determine whether the sensor information matches the reference position information. In the control terminal 201, an operation instruction for notifying a determination result is relayed by the centralized control apparatus 200 and transmitted to each haptic apparatus 100. In addition, the control terminal 201 controls a state display in the plurality of haptic apparatuses 100. The control terminal 201 takes statistics regarding the gripping position and display the statistic. In addition, the control terminal 201 manages information on the gripping position in each haptic apparatus 100 in association with position information or a solid identification code of its haptic apparatus 100.

Figure 13:
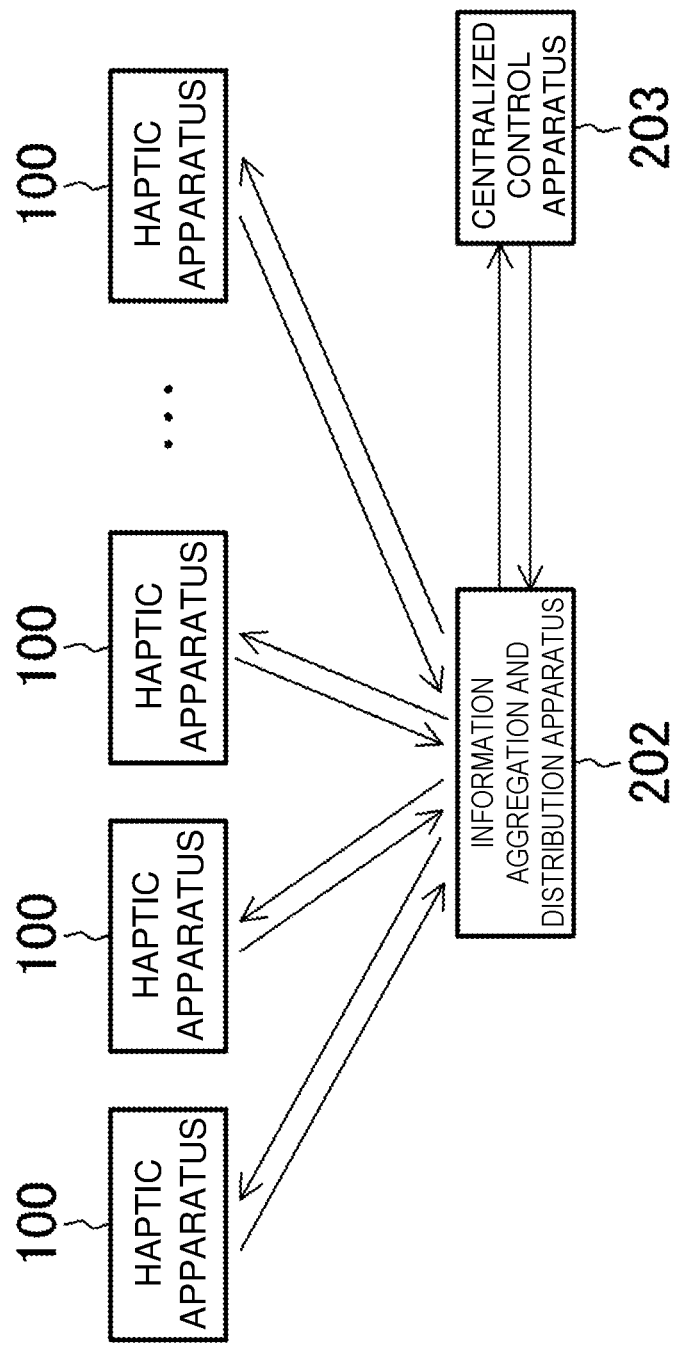
FIG. 13 is a configuration diagram showing a configuration of the haptic apparatus according to the embodiment of the present invention.

As shown in FIG. 13, the sensor information from the plurality of haptic apparatuses 100 may be relayed by an information aggregation and distribution apparatus 202 and transmitted to a centralized control apparatus 203, and the centralized control apparatus 203 may determine whether the sensor information matches the reference position information. In the centralized control apparatus 203, the operation instruction for notifying a determination result is relayed by the information aggregation and distribution apparatus 202 and transmitted to each haptic apparatus 100.

Figure 14A:
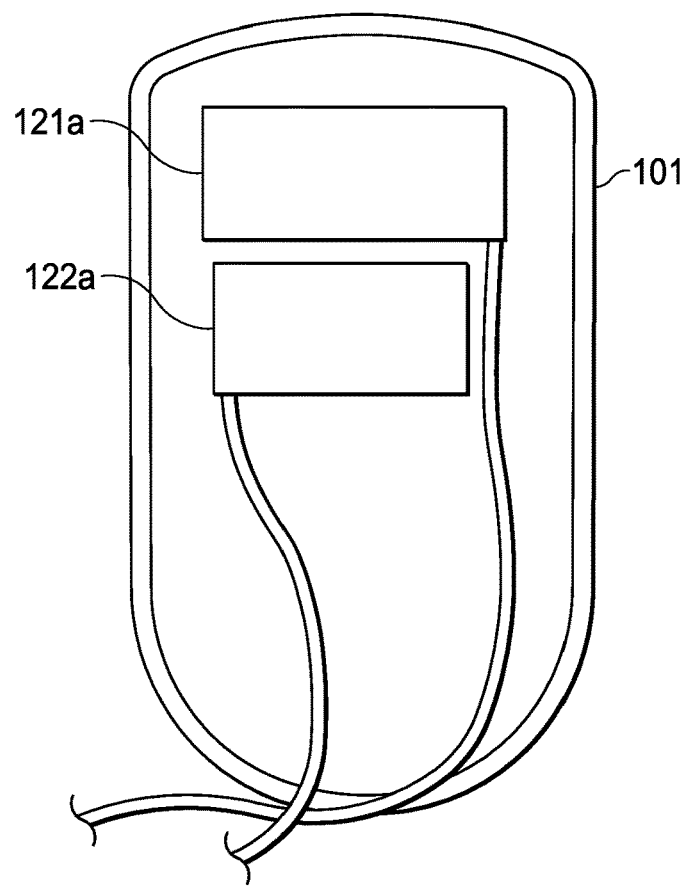
FIG. 14A is a plan view showing a partial configuration of the haptic apparatus according to the embodiment of the present invention.

Next, more detailed description will be made using an example. For example, as shown in FIG. 14A, an electrode 121a and an electrode 122a for detecting contact of a finger of the user gripping the casing 101 are provided on the backside of the casing 101. When the electrode 121a detects contact of a finger to the casing 101 and the electrode 122a does not detect contact of a finger to the casing 101, this state is set as a correct gripping state and other states are set as wrong gripping states.

Figure 14B:
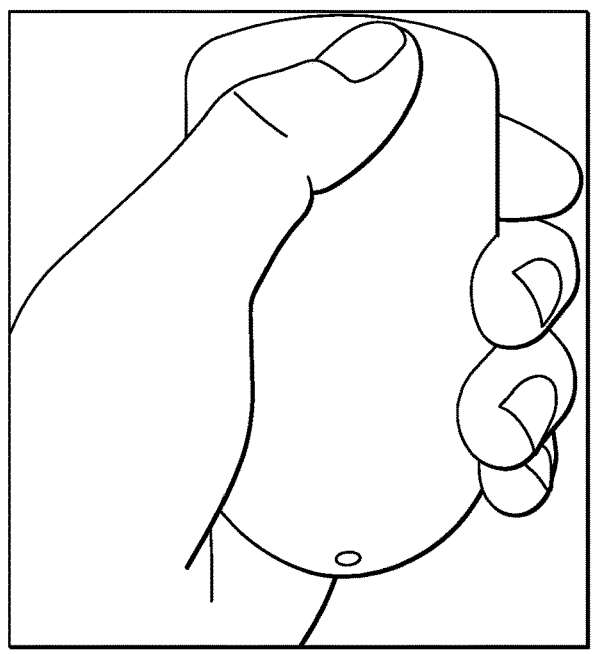
FIG. 14B is a photo explaining a guidance example of how to grip using the haptic apparatus according to the embodiment of the present invention.
Figure 14C:
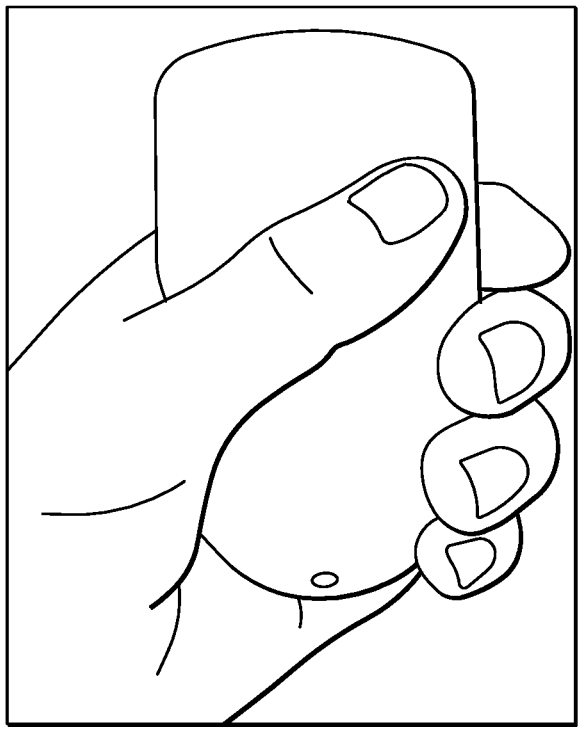
FIG. 14C is a photo explaining a guidance example of how to grip using the haptic apparatus according to the embodiment of the present invention.
Figure 14D:
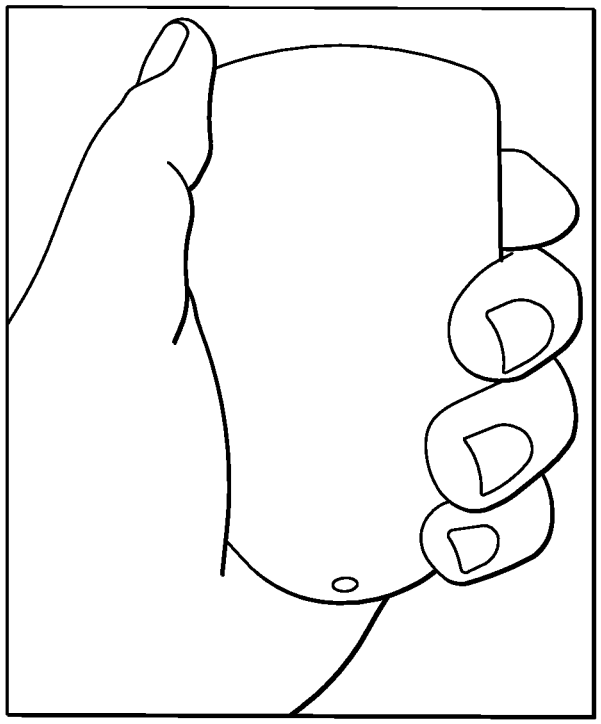
FIG. 14D is a photo explaining a guidance example of how to grip using the haptic apparatus according to the embodiment of the present invention.
Figure 15:
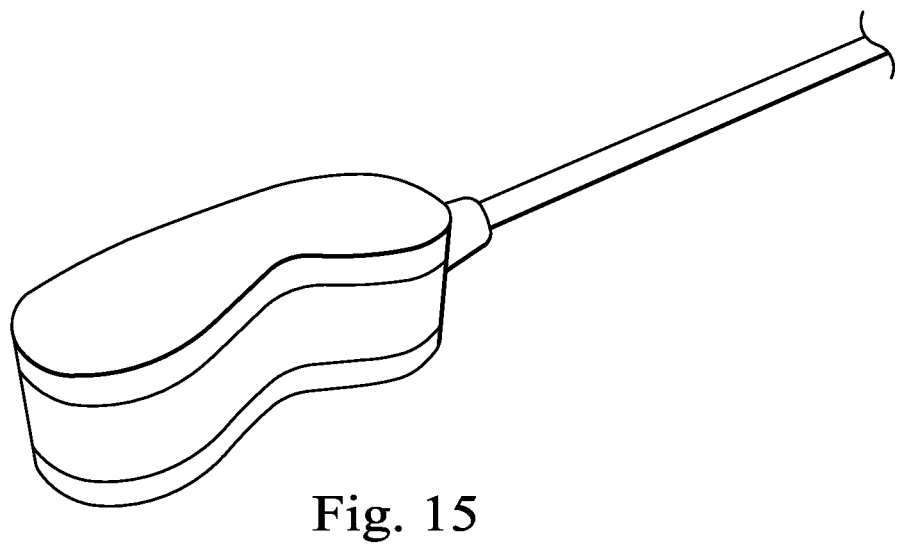
FIG. 15 is a photo shown in Patent Literature 2.

In the above-described configuration, as shown in FIG. 14B, when a tip of a thumb is disposed at the position of the electrode 121a, the electrode 121a detects contact of the thumb, whereas the electrode 122a does not detect contact of a finger to the casing 101. As a result, in the state shown in FIG. 14B, the user is notified that the gripping position is correct. On the other hand, in states shown in FIGS. 14C and 14D, since the electrode 121a does not detect contact of a finger, the user is notified that the gripping position is wrong. Furthermore, in the state shown in FIG. 14C, the electrode 122a detects contact of a finger, so it is possible to send (give) the user a notice indicating that the contact position is lower than the predetermined position or the predetermined position is higher than the contact position as a more specific instruction.

As described above, in embodiments of the present invention, the sensor detects contact of the finger of the user gripping the casing, the determination unit determines whether the sensor information on the contact position of the finger detected by the sensor matches the preset reference position information, and when the sensor information does not match the reference position information, the user is notified that the contact position of the finger is shifted. As a result, according to embodiments of the present invention, it is possible to more easily guide how to grip the casing.

In the conventional art, as a result of tending to cause grip different from the intention of a designer, a tactile effect is not sufficiently obtained and an optimum state is often not obtained. In addition, even if there is an instructor who gives operation guidance, direct contact with another person is necessary for guidance, and a gripping state may be hidden by a palm or fingers and cannot be sufficiently checked. When an operator is in a remote place or there are many operators, it is hard to individually check. For these reasons, it has been sometimes difficult to achieve a sufficient tactile effect.

According to embodiments of the present invention, the tactile effect is sufficiently obtained and the optimum state is obtained. The direct contact with another person for guidance is not necessary and the gripping state can be sufficiently checked. In addition, even when a user (operator) is in a remote place or there are many users, it is possible to individually check.

Note that the present invention is not limited to the embodiment described above and it is clear that many modifications and combinations can be made by those having ordinary knowledge in the art within the technical idea of the invention.

REFERENCE SIGNS LIST

100 Haptic apparatus
101 Casing
102 Sensor
103 Determination unit
104 Notification unit
105 Tactile stimulus generation unit.

The invention claimed is:

1. A haptic apparatus, comprising:
a casing;
a sensor that detects contact of a finger of a user who grips the casing;
a processor configured to determine whether sensor information on a contact position of the finger detected by the sensor matches preset reference position information;
a notification generator that notifies a first indication indicating that the contact position of the finger is shifted from a reference position in response to the sensor information not matching the preset reference position information or a second indication indicating that the contact position of the finger matches the reference position in response to the sensor information matching the preset reference position information; and
a tactile stimulus generator that provides the first indication or the second indication as a tactile stimulus for the user gripping the casing, wherein a first electrode of the sensor is connected to a second electrode of the tactile stimulus generator so as to be common or electrically equipotential.

2. The haptic apparatus according to claim 1, wherein the sensor is one of a plurality of sensors in the casing, and wherein processor uses, as the sensor information, a combination of detection results of the contact of the finger from the plurality of sensors or a value derived by a relational formula and the detection results of the contact of the finger from the plurality of sensors.

3. The haptic apparatus according to claim 1, wherein the sensor is a capacitance type sensor.

4. The haptic apparatus according to claim 1, wherein the tactile stimulus generator comprises an actuator that generates mechanical vibration as the first indication or the second indication.

5. The haptic apparatus according to claim 4, wherein the actuator provides the first indication and the second indication, wherein the actuator provides the first indication by continuous vibration, and wherein the actuator provides the second indication by discontinuous vibration.

6. The haptic apparatus according to claim 4, wherein the first electrode of the sensor is connected to the second electrode of the actuator so as to be common or electrically equipotential.

7. The haptic apparatus according to claim 1, wherein the tactile stimulus generator comprises a plurality of electrodes that provide an electric stimulus to the finger.

8. The haptic apparatus according to claim 7, wherein the plurality of electrodes of the tactile stimulus generator comprises the second electrode.

9. A method, comprising:
detecting, by a sensor, a finger of a user who grips a casing, wherein the sensor is disposed in the casing;
determining whether sensor information on a contact position of the finger detected by the sensor matches preset reference position information;
generating a first indication indicating that the contact position of the finger is shifted from a reference position in response to the sensor information not matching the preset reference position information or a second indication indicating that the contact position of the finger matches the reference position in response to the sensor information matching the preset reference position information; and
providing, by a tactile stimulus generator, the first indication or the second indication as a tactile stimulus for the user gripping the casing, wherein a first electrode of the sensor is connected to a second electrode of the tactile stimulus generator so as to be common or electrically equipotential.

10. The method according to claim 9, wherein the sensor is one of a plurality of sensors in the casing, and wherein determining whether the sensor information matches the preset reference position information comprises using, as the sensor information, a combination of detection results of the contact of the finger from the plurality of sensors or a value derived by a relational formula and the detection results of the contact of the finger from the plurality of sensors.

11. The method according to claim 9, wherein the sensor is a capacitance type sensor.

12. The method according to claim 9, wherein providing the tactile stimulus comprises providing the tactile stimulus through an actuator that generates mechanical vibration as the first indication or the second indication.

13. The method according to claim 12, wherein the actuator provides the first indication and the second indication, wherein the actuator provides the first indication by continuous vibration, and wherein the actuator provides the second indication by discontinuous vibration.

14. The method according to claim 12, wherein the first electrode of the sensor is connected to the second electrode of the actuator so as to be common or electrically equipotential.

15. The method according to claim 9, wherein providing the tactile stimulus comprises providing the tactile stimulus through a plurality of electrodes that provide an electric stimulus to the finger.

16. The method according to claim 15, wherein the plurality of electrodes of the tactile stimulus generator comprises the second electrode.

\* \* \* \* \*